United States Patent
Hines

(10) Patent No.: US 7,948,515 B1
(45) Date of Patent: May 24, 2011

(54) MINI 3-D CAMERA RIG

(76) Inventor: Stephen P. Hines, Glendale, CA (US)

( * ) Notice: Subject to any disclaimer, the term of this patent is extended or adjusted under 35 U.S.C. 154(b) by 0 days.

(21) Appl. No.: 12/455,772

(22) Filed: Jun. 5, 2009

(51) Int. Cl.
*H04N 13/02* (2006.01)

(52) U.S. Cl. .......................................................... 348/47
(58) Field of Classification Search ...................... 348/47
See application file for complete search history.

(56) References Cited

U.S. PATENT DOCUMENTS

| | | | |
|---|---|---|---|
| 4,557,570 A | | 12/1985 | Hines |
| 4,650,305 A | * | 3/1987 | Hines ............................ 396/325 |
| 4,908,640 A | * | 3/1990 | Masuda ........................ 396/429 |
| 5,175,616 A | * | 12/1992 | Milgram et al. ................ 348/47 |
| 5,337,101 A | * | 8/1994 | Lin .................................. 353/7 |
| 6,163,336 A | * | 12/2000 | Richards ........................ 348/42 |
| 6,507,359 B1 | * | 1/2003 | Muramoto et al. ............. 348/47 |

* cited by examiner

*Primary Examiner* — Y. Lee
*Assistant Examiner* — Richard Torrente
(74) *Attorney, Agent, or Firm* — Roy L Anderson; Wagner, Anderson & Bright, P.C.

(57) ABSTRACT

A dual-camera 3-D rig has a support, a first camera with a first lens mounted to the support in a stationary position, a structural member with a curve affixed to the support adjustable over a range of positions to cause the curve to rotate relative to the axis of the structural member, and a second camera with a second lens slidably mounted to the structural member so it is free to move along the curve to vary interaxial spacing between the two cameras while the convergence distance between the two cameras is varied by adjustment of the curved structural member over a range of positions. Pinhole lenses are used and a mirror is positioned along an axis of the first lens in a position such that a reflected image of a first camera entrance pupil is at the height and longitudinal position of the second camera entrance pupil.

10 Claims, 12 Drawing Sheets

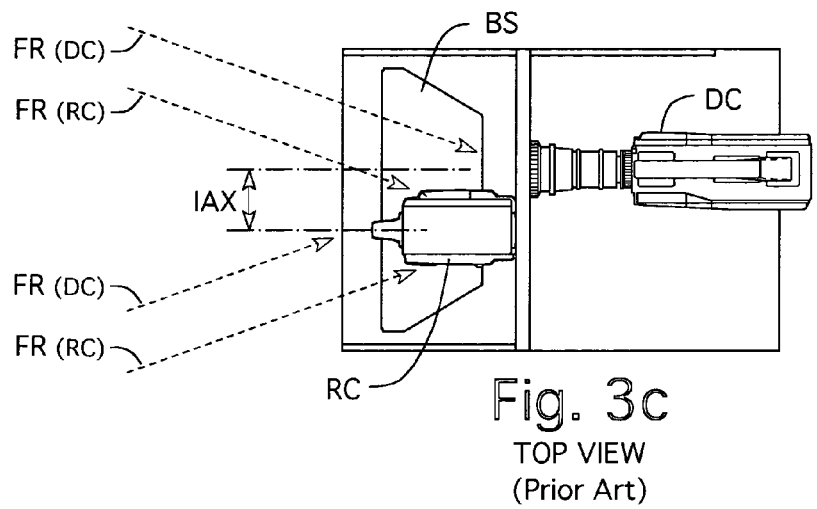
Fig. 3c
TOP VIEW
(Prior Art)
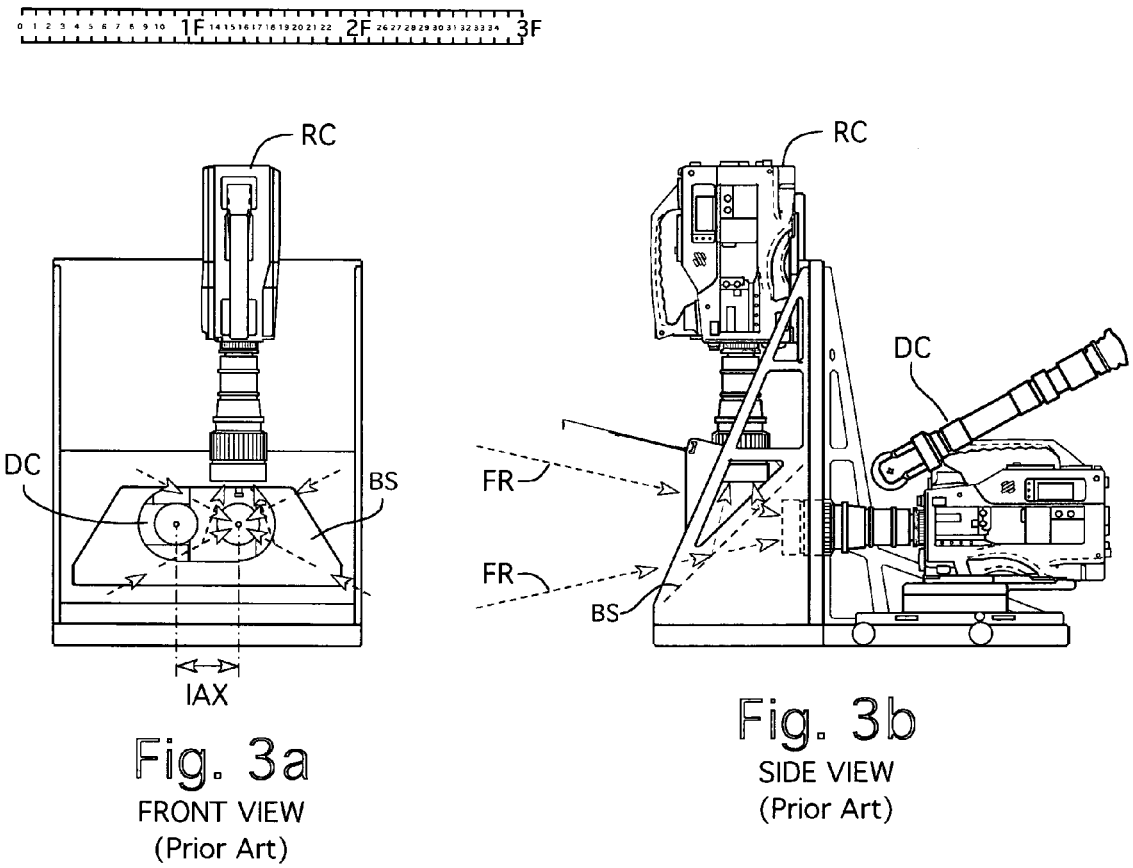
Fig. 3a
FRONT VIEW
(Prior Art)
Fig. 3b
SIDE VIEW
(Prior Art)

1/2" INTERAXIAL

1/2" INTERAXIAL 2-1/2" INTERAXIAL 2-1/2" INTERAXIAL 4-1/2" INTERAXIAL 4-1/2" INTERAXIAL

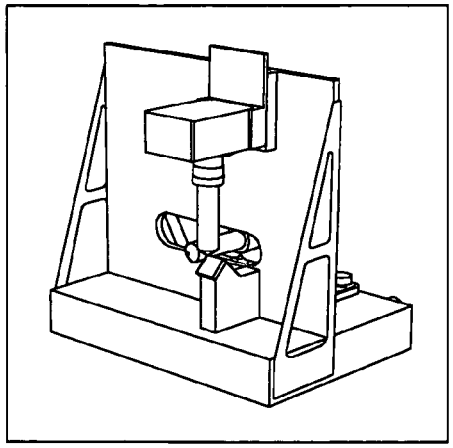
FIG. 5a, CONVERGED ON FRONT CORNER
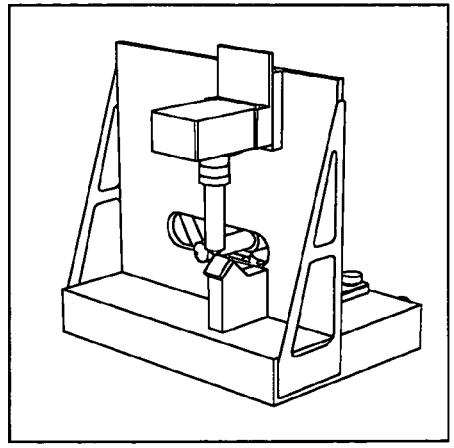
FIG. 5a, CONVERGED ON FRONT CORNER
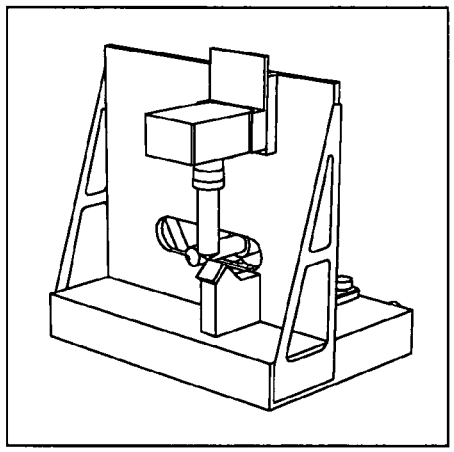
FIG. 5b, CONVERGED IN MIDDLE
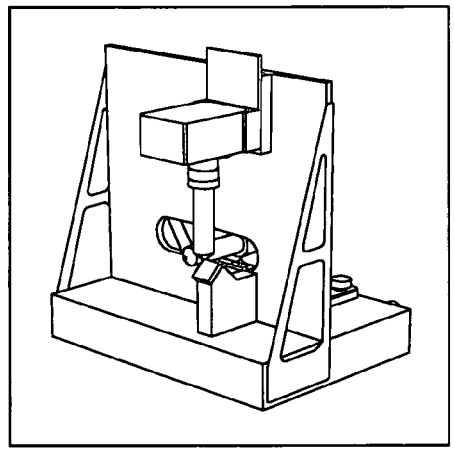
FIG. 5b, CONVERGED IN MIDDLE
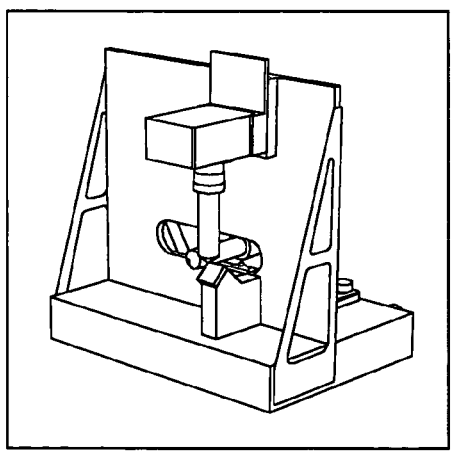
FIG. 5c, CONVERGED FARTHER BACK
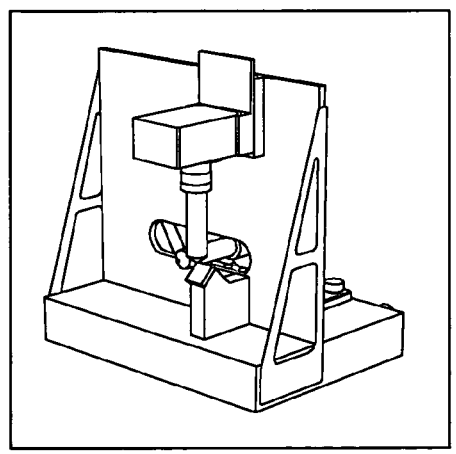
FIG. 5c, CONVERGED FARTHER BACK Video Camera Lens 65mm-Format Movie Camera Lens (Prior Art)

35mm-Format Movie Camera Lens
(Prior Art)

CCTV Camera Lens

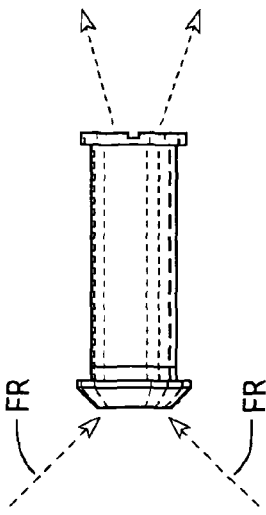
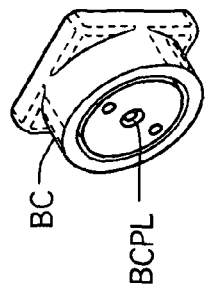
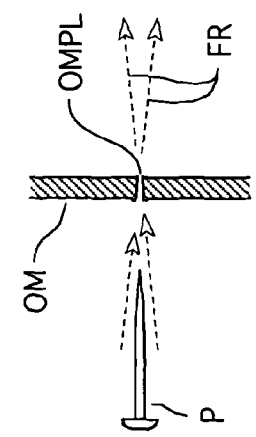
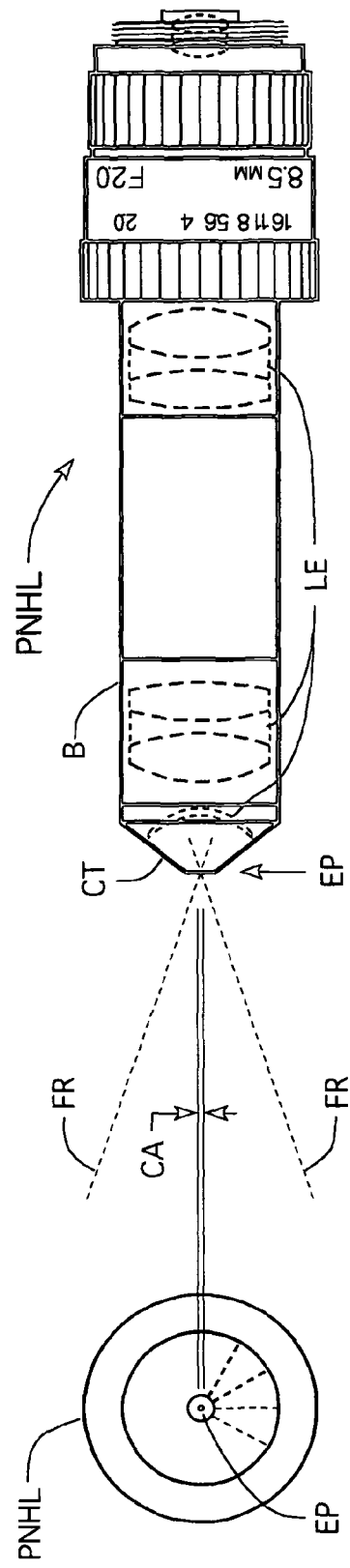

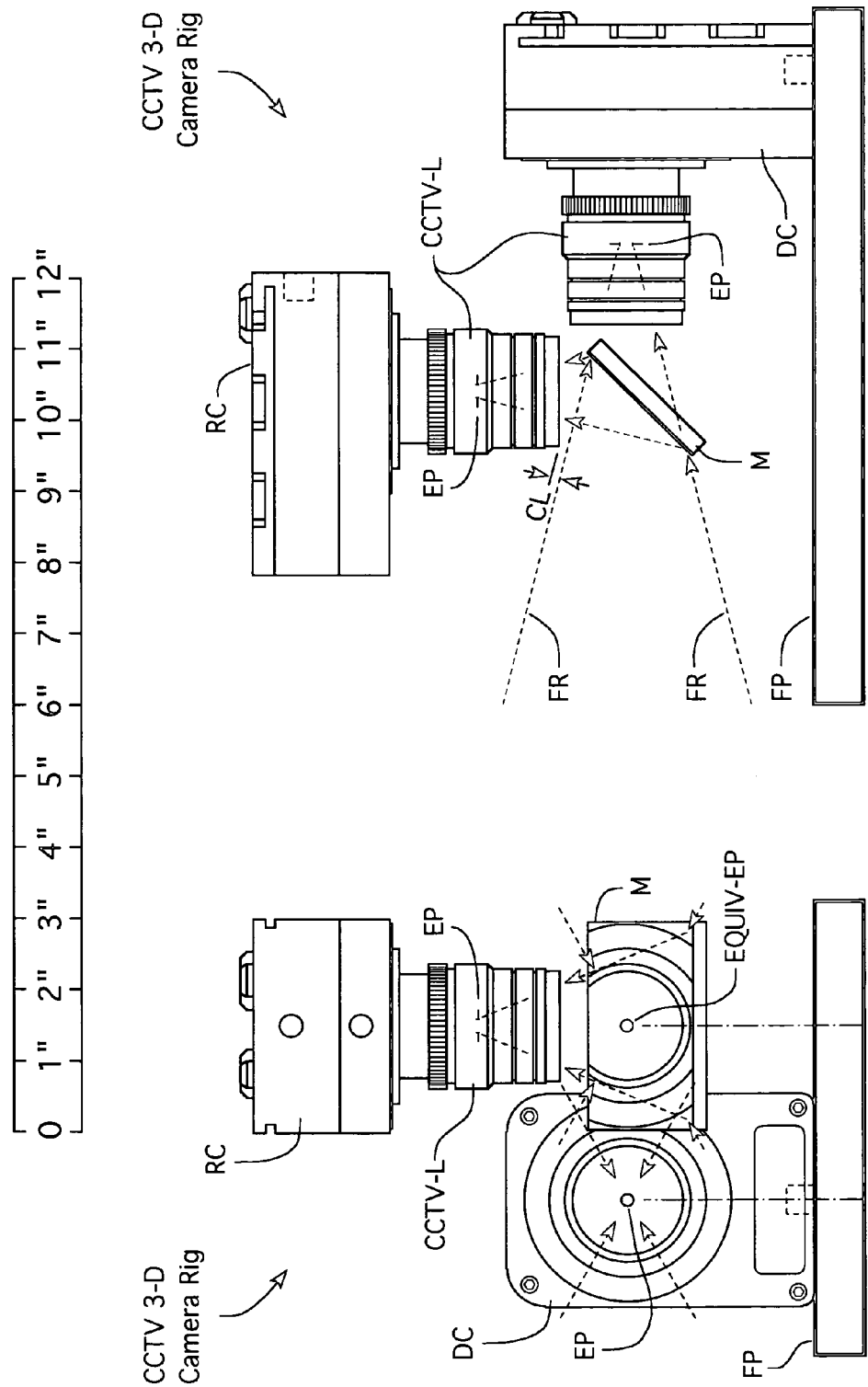
FIG. 14b SIDE VIEW
FIG. 14a FRONT VIEW

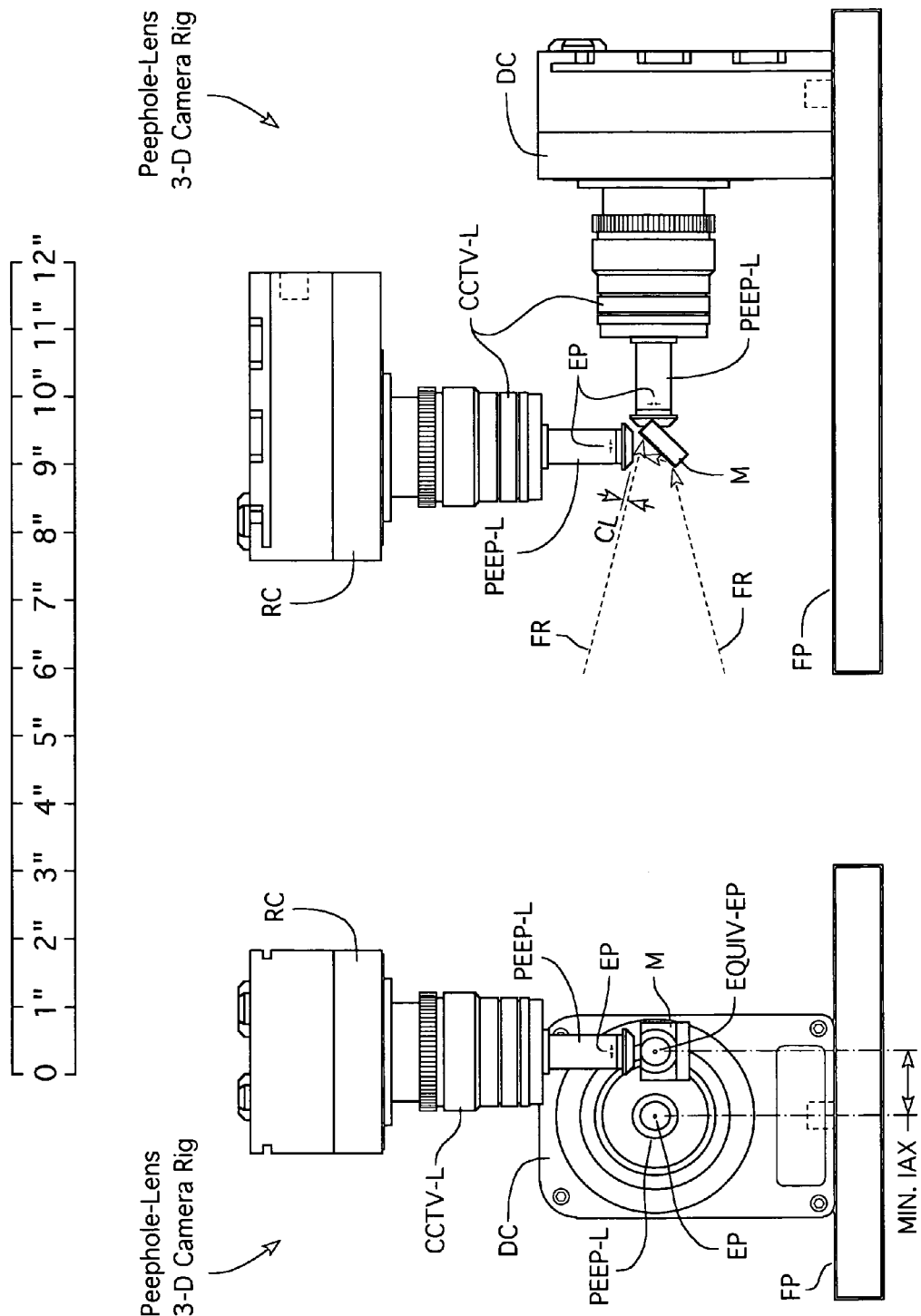

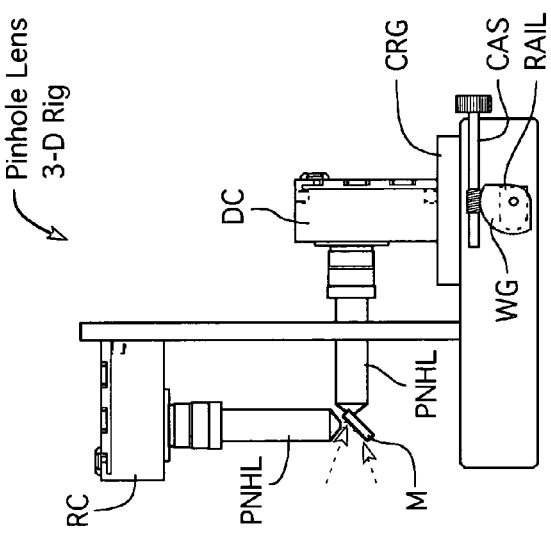
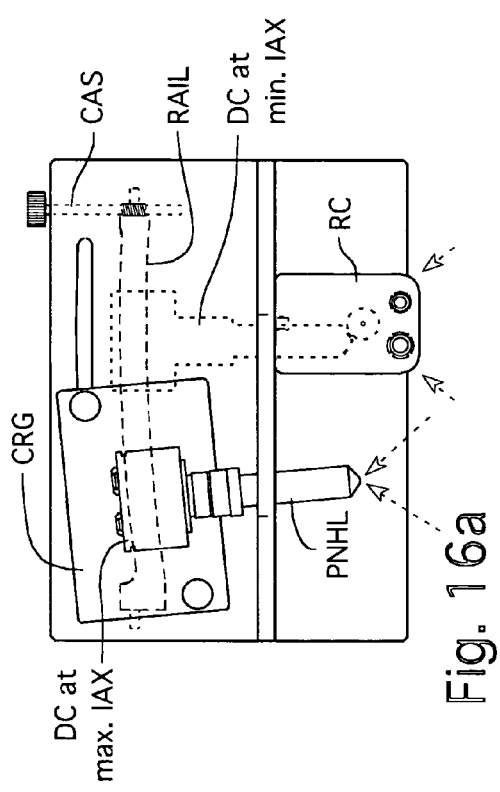
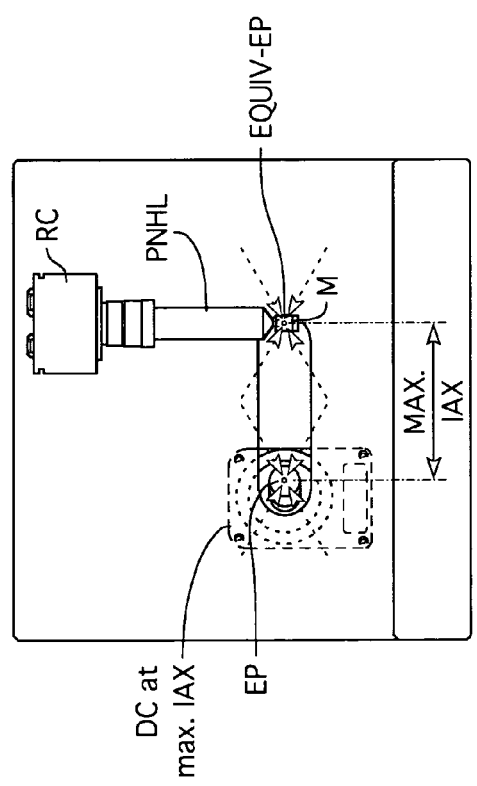

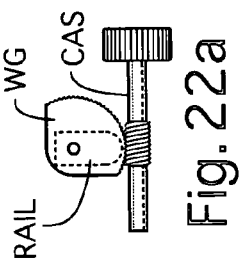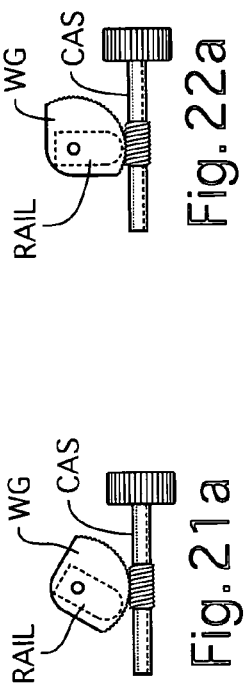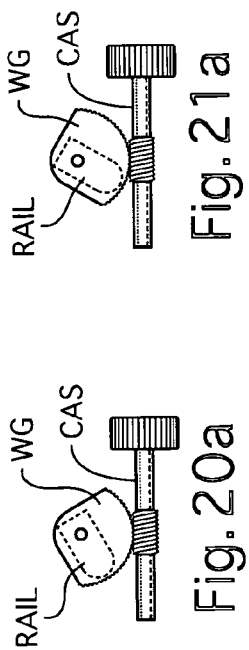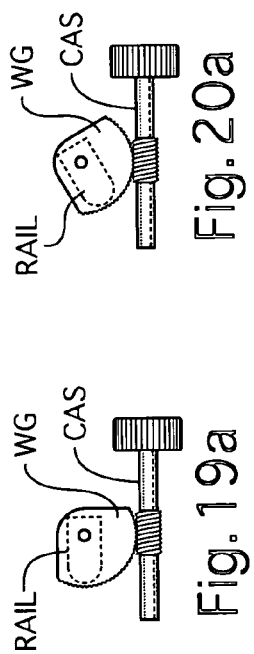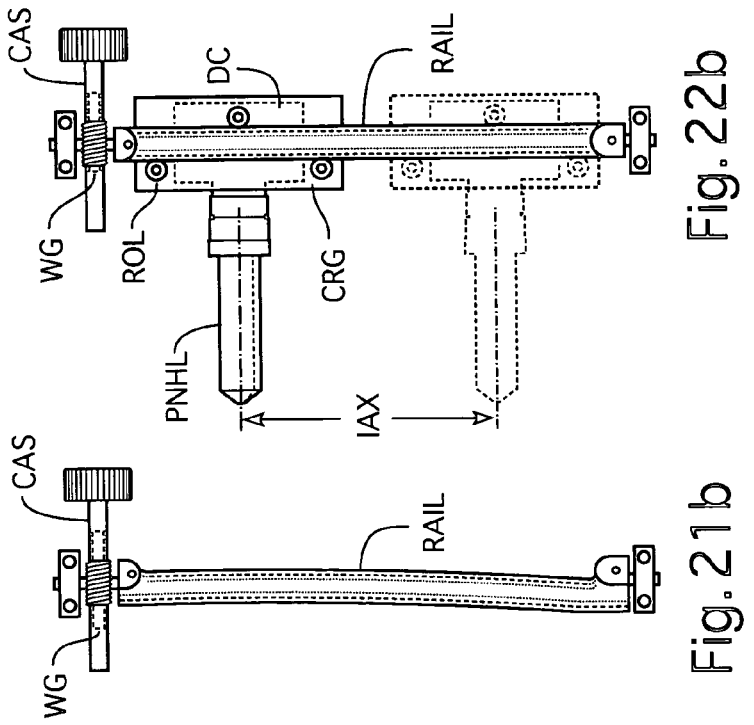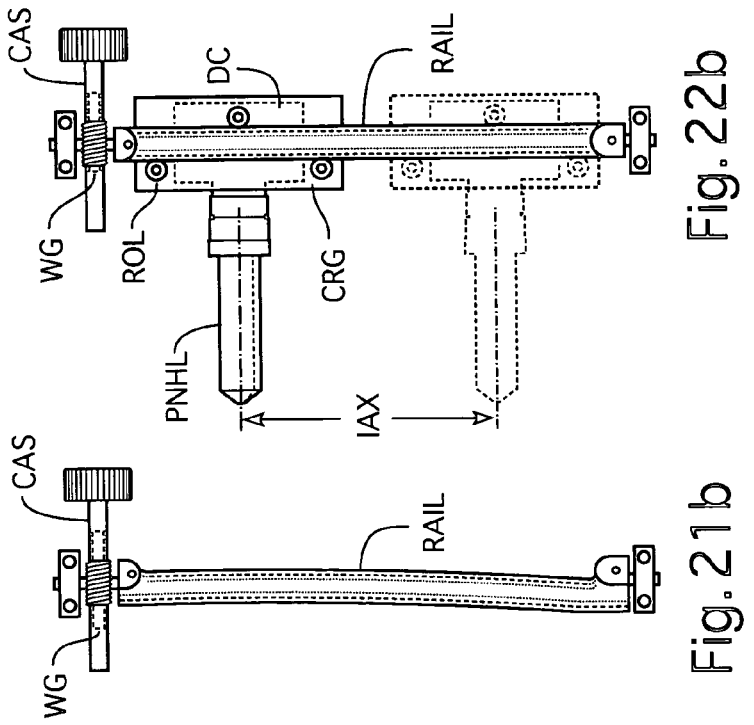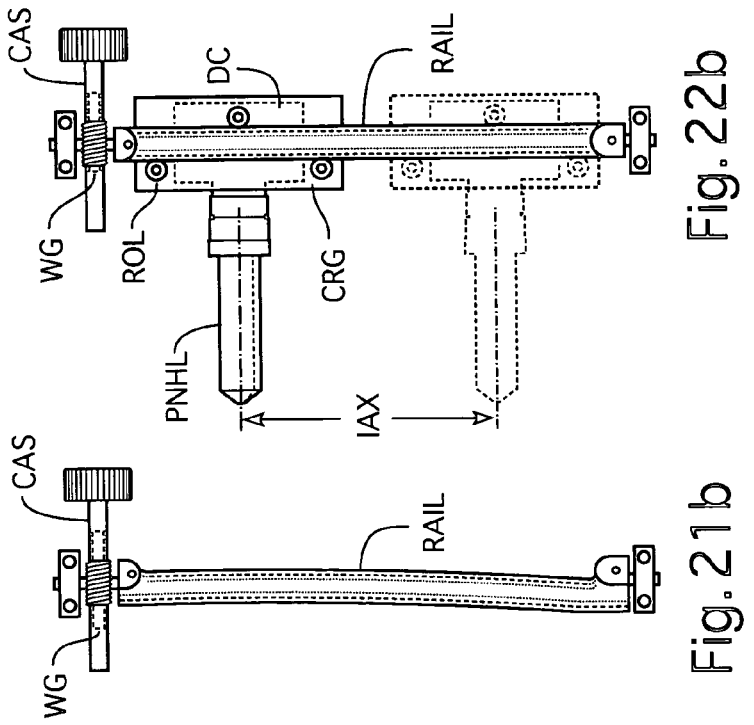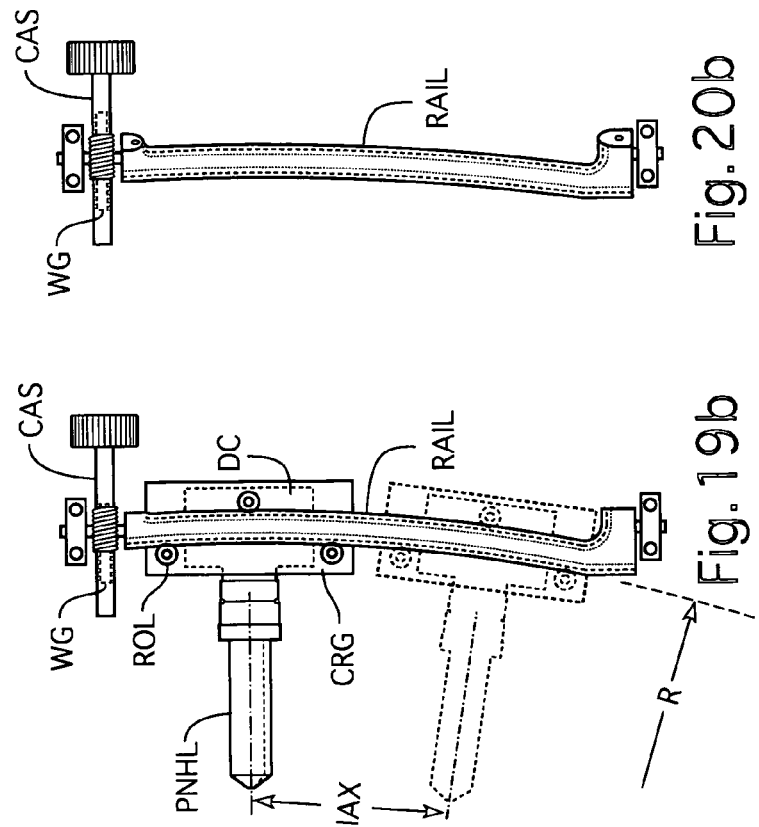

MINI 3-D CAMERA RIG

FIELD OF THE INVENTION

The present invention is in the field of cameras mounted in a rig useful for three-dimensional (3-D) photography.

BACKGROUND OF THE INVENTION

The production of three-dimensional photographs, both cine and still, is well known in the art and usually involves the use of two cameras which record the same scene from slightly different positions. Typically, the nominal effective lateral displacement between the respective optical axes of the cameras, known as the interaxial spacing, is approximately equal to the average spacing between the eyes of a viewer (i.e. about 2.5 inches). This spacing would produce the same 3-D effect as that perceived by a viewer who viewed the scene from the camera location. A greater or lesser interocular spacing is sometimes desirable to produce greater or lesser depth. Hence, conventional 3-D camera systems commonly include some means for adjusting the position of one camera relative to the other to vary the interaxial spacing over a continuous range from zero to about 4 or 5 inches.

FIGS. 4a-c are stereoscopic-pair drawings to show the change on stereoscopic depth of a scene as a result of increasing the interaxial spacing (using a 3-D camera rig of this invention as the subject of the drawings). These stereo drawings are intended to be free viewed, with the left images on the left, right images on the right (not cross eyed). When viewed in 3D, FIG. 4a shows the stereoscopic depth as if photographed with a 0.5-inch interaxial spacing. FIG. 4b shows the same subject as if photographed with a 2.5-inch spacing (equal to the distance between our eyes, and therefore more normal depth). FIG. 4c shows exaggerated stereo depth as if photographed at 4.5-inch interaxial spacing. Interaxial adjustment is one of two primary controls that a stereographer needs to shoot a 3-D movie (the other adjustment being the convergence distance, see FIG. 5).

Aside from interaxial spacing adjustment, the off-screen position of images can also be controlled by varying the convergence distance at which the optical axes of the respective 3-D camera lenses intersect. When 3-D images are projected for viewing, such convergence distance determines the distance at which objects within the scene appear to be located front-to-back relative to the projection screen. When the convergence angle is such that the camera axes intersect at, say, thirty feet in front of the cameras, objects in the foreground and background will appear to a viewer to be positioned in front of and behind the screen, respectively. Special well known 3-D effects can be achieved in 3-D motion picture photography by varying the convergence distance during filming, and conventional 3-D camera systems commonly include means for adjusting the convergence distance of the lens axes of the two cameras to vary such distance over a continuous range between infinity and about four feet measured from the camera.

FIGS. 5a-c are stereoscopic-pair drawings with a fixed amount of stereo depth, or amount of 3D, using a 2.5-inch interaxial spacing, however showing the effect of changing the convergence distance. For reference, any object photographed at the convergence distance (the distance where the two camera lens axes intersect in space) will be seen by the audience on the surface of the theater screen. Objects farther than the convergence distance will appear farther, behind the screen. Objects closer than the convergence will appear closer than the screen, floating out toward the audience. It is important for 3-D camera rigs to provide the ability to change convergence distance to allow the camera operator to push and pull the image in or out of the screen. FIG. 5a is drawn as if the right and left cameras converged on the front corner of the object. This places the image at the screen plane (the plane of the paper) and behind. FIG. 5b is drawn with "cameras" converged at an intermediate depth in the scene, so that the front part of the image comes off the paper, and the back part recedes into the paper. FIG. 5c is drawn with the convergence distance at the back of the scene, so that the entire image protrudes off the paper.

There are three basic approaches to stereoscopic or 3-D photography.

The most basic approach for stereoscopic or 3-D photography has been done with single-lens adapters. The primary advantage of this approach is that it is simple because it uses a single camera, reducing the cost. The disadvantages of this approach are that the interaxial spacing is fixed, restricted by the size of the lens, and frequently the convergence distance is fixed. The left and right images are squeezed onto a single frame of film, compromising the image quality.

Another way stereoscopic or 3-D photography has been done is with side-by-side cameras as illustrated in FIG. 1 in which a 1-foot long ruler is shown for reference. The advantages of this approach are no light loss to the cameras, compared to beamsplitter rigs, and that such rigs are simple and inexpensive. The disadvantage of this approach is that the minimum interaxial spacing can be no less than the width of the camera. For example, Panavision 35 mm film cameras are approximately 10.5 inches wide, although some new video cameras are as narrow as 3 inches. However, even a 3-inch interaxial spacing is too wide for most shots. Therefore, side-by-side rigs are not practical for most 3-D work.

A third way stereoscopic or 3-D photography has been done is with beamsplitter rigs as illustrated in FIGS. 2a-c. FIG. 2a shows the laterally adjustable camera DC parallel to (no convergence) and beside the optically equivalent position of the stationary camera RC. Camera DC is spaced laterally at an interaxial spacing IAX from the optically equivalent position of the stationary camera RC. The camera lens axes are parallel and are considered to converge at infinity. FIG. 2b shows the direct camera DC at the same lateral position (interaxial spacing) as in FIG. 2a; however, toed in at a slight angle so that the lens center line converges with stationary camera RC at a distance, less than infinity but outside of the left side of the drawing. FIG. 2c shows the direct camera DC at the same angle as in FIG. 2b; however at a reduced interaxial spacing. Notice that the convergence distance has unintentionally and undesirably been reduced as well. This conventional 3-D rig design lacks the independence between adjustments of interaxial and convergence.

The advantages of using a beamsplitter rig are that the laterally-adjustable camera DC can be positioned in the optically-equivalent position of the fixed camera RC providing a minimum interaxial spacing of as little as 0.0 inches. Disadvantages are the 50% light loss to both cameras from the beamsplitter, the large size of the beamsplitter required due to the horizontal field of view of the laterally adjustable camera DC in its maximum interaxial position, and the difficulty of rigidly mounting the thin glass beamsplitter supported on its bottom edge. The large size beamsplitter is required because the camera lens sees the scene as a wider-than-high rectangle in front of the camera. Light from the scene converges into the lens and passes through the lens' entrance pupil, well inside the lens, where the light rays are at their smallest diameter.

FIGS. 6-9 show a variety of conventional camera lenses, drawn at the same scale, used in the motion picture and television industries. In all cases, note the position of the entrance pupils EP being well inside the lens barrels at a distance of DEP, and the clear area CA at the front of the lenses, required if a mirror or beamsplitter is used in a 3-D rig application. Because traditional lenses used in the motion picture industry are physically large, and have the entrance pupil inside the lens barrel, and because the beamsplitter must be located out in front of the lens by several inches, a sizeable portion of the beamsplitter is required to cover the image as it passes through, or is reflected off of, the beamsplitter. The physical scale of the cameras, lenses and beamsplitter limits how small a beamsplitter-type 3-D camera rig can be.

Because traditional lenses used in the motion picture industry are physically large, and have the entrance pupil inside the lens barrel, and because the beamsplitter must be located out in front of the lens by several inches, a sizeable portion of the beamsplitter is required to cover the image as it passes through, or is reflected off of, the beamsplitter. The physical scale of the cameras, lenses and beamsplitter limits how small a beamsplitter-type 3-D camera rig can be.

FIGS. 3a-c show a state-of-the art dual-camera beamsplitter 3-D rig fitted with video cameras. The physical size of the cameras and lenses, and lens field of view and position of entrance pupil deep in the lens causes the rig to be rather large. A 3-foot ruler is included for reference. The advantages of this approach are the narrow rig with wide-angle lenses, rigid structure, that the cameras interaxial spacing can be adjusted to as little as 0.0 inches. The disadvantages are the physical size of the rig, the weight, and the light loss due to the 50/50 beamsplitting mirror.

The ease of use of rigs used in stereoscopic or 3-D photography today is limited by physical size limitations or compromises in versatility and adaptability that are not generally acceptable. Accordingly, there has been a long felt need in 3-D photography for new and improved rigs that are smaller, lighter and easier to use while still permitting interaxial spacing and/or convergence distance adjustments desired by filmmakers.

SUMMARY OF THE INVENTION

The present invention is generally directed to an apparatus for stereoscopic photography having a support, a first camera with a first lens mounted to the support in a stationary position, a curved structural member rotatably affixed to the support that is adjustable rotationally over a range of positions to cause the curved structural member to rotate about the axis of the structural member, and a second camera and lens slidably mounted to the structural member so that it is free to move along the curve so as to vary interaxial spacing between the two cameras while the convergence distance between the two cameras is varied by adjustment of the curved structural member between the two positions.

In a first, separate group of aspects of the present invention, the lenses may be pinhole lenses and a mirror is positioned along an axis of the first lens in a position such that a reflected image of a first camera entrance pupil is at the same (or substantially the same) height as a second camera entrance pupil. The pinhole lens can have a barrel, multiple lens elements located in the barrel, and an entrance pupil at the front protruding conical tip of the barrel.

In a second, separate group of aspects of the present invention, stereoscopic photography (such as a live-action motion picture or a stereoscopic still photograph) is shot by use of a pair of cameras, at least one of which has a pinhole lens.

It is therefore an object of the present invention to provide an improved camera rig useful for three-dimensional (3-D) photography.

These and further objects and advantages will be apparent to those skilled in the art in connection with the drawings and the detailed description of the invention set forth below.

BRIEF DESCRIPTION OF THE DRAWINGS

FIGS. 3a-c show a state-of-the art dual-camera beamsplitter 3-D prior art rig fitted with video cameras.

FIGS. 5a-c are stereoscopic-pair drawings with a fixed amount of stereo depth, or amount of 3D, using a 2.5-inch interaxial spacing, however showing the effect of changing the convergence distance.

FIG. 10 is the original pinhole "lens" made by punching a straight pin or needle through black cardboard to make a pinhole camera.

FIG. 11 is a board-level camera from approximately 0.75 to 0.25 inch square, mounted to an electrical circuit board to be integrated into security surveillance cameras and cell phones.

FIG. 12 is the type of pinhole lens utilized in an especially preferred embodiment of the present invention.

FIG. 13 is a door peephole lens, not an image-forming lens, but rather an afocal wide-angle lens adapter.

FIGS. 14a-b are of a dual camera 3-D rig using a fully reflective mirror and cameras fitted with compact lenses CCTV-L.

FIGS. 15a-b are of a dual camera 3-D rig using a fully-reflective first-surface mirror and cameras fitted with compact lenses CCTV-L and peephole lenses PEEP-L.

FIGS. 16a-c are of a compact dual-camera 3-D rig, the subject of this invention, which makes use of pinhole lenses PNHL, of FIG. 12b, and mirror M.

FIGS. 19*a*-22*b* show the convergence mechanism adjusted to different convergence distances. The convergence distance affects the off screen position of images shot in 3-D, and needs to be adjustable in a 3-D camera rig to place images at the correct distance from the audience, and to avoid breaking frame.

DESCRIPTION OF THE INVENTION

In the Figures and the following description, letter designations indicate various features of the invention, with like letter designations referring to like features throughout both the drawings and the description. Although the Figures are described in greater detail below, the following is a glossary of the elements identified in the Figures.

Figure 1:
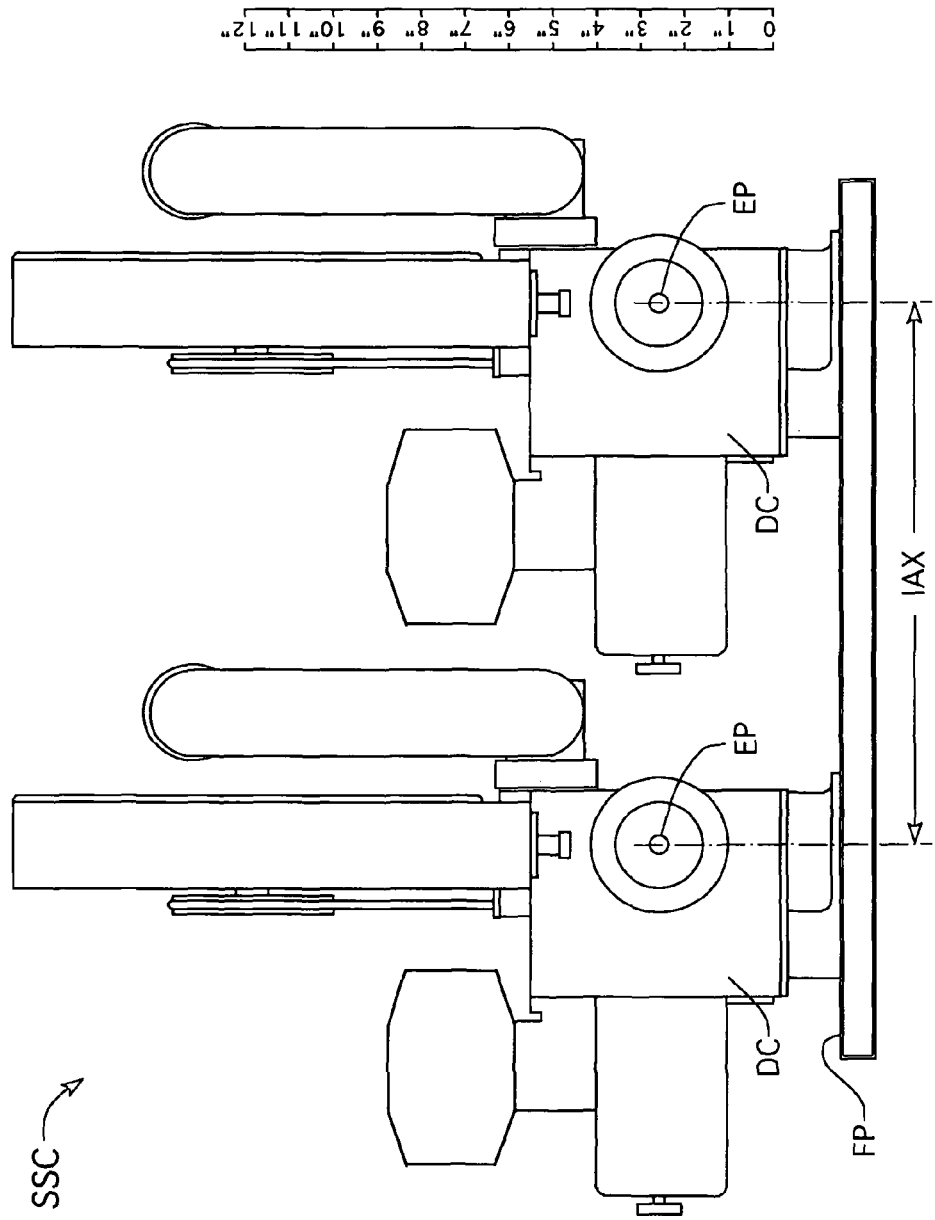
FIG. 1 is a front view of a simple dual-camera 3-D prior art rig comprised of two side-by-side 35 mm film cameras DC viewing the scene directly, spaced as closely as practical.
Figure 2A:
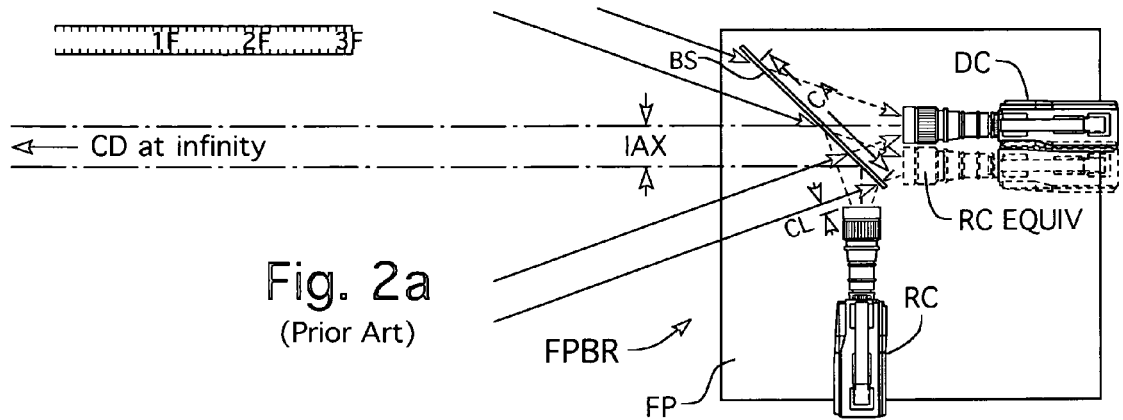
FIGS. 2a-2c show a top plan view of a typical flat-plate beamsplitter 3-D prior art rig FPBR, showing a stationary camera RC seeing an image reflected off of a beam-splitting mirror BS, and a laterally-adjustable camera DC taking the image transmitted through the vertically mounted beamsplitter BS.
Figure 2B:
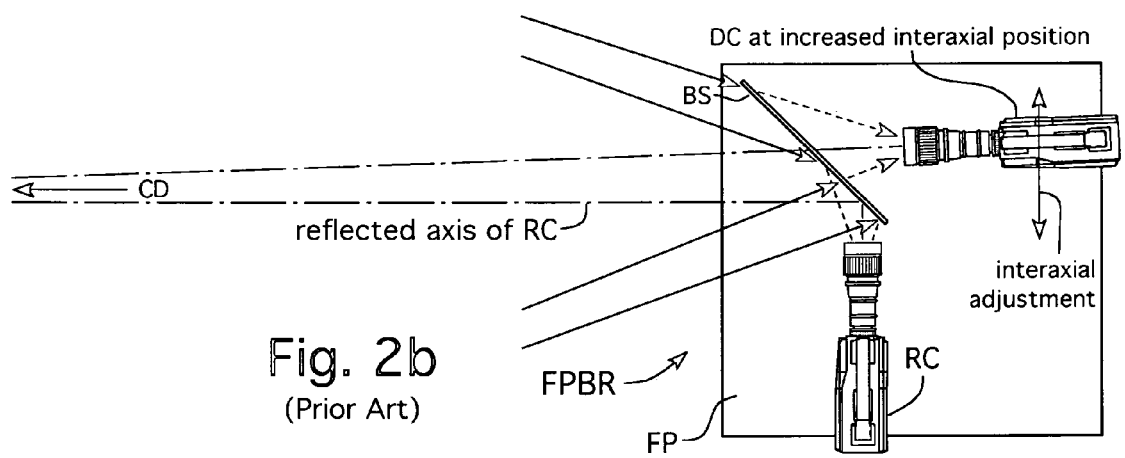
Figure 2C:
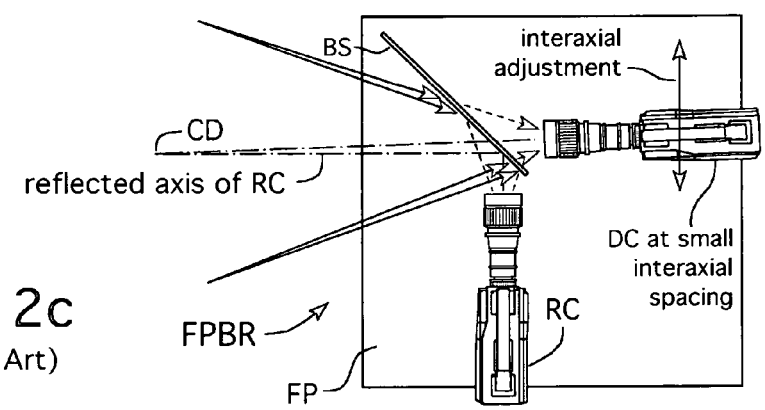
Figure 4A:
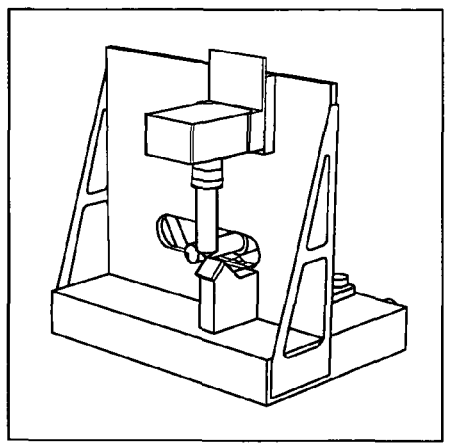
FIGS. 4a-c are stereoscopic-pair drawings to show the change on stereoscopic depth of a scene as a result of increasing the interaxial spacing (using the 3-D camera rig of this invention as the subject of the drawings).
Figure 4A:
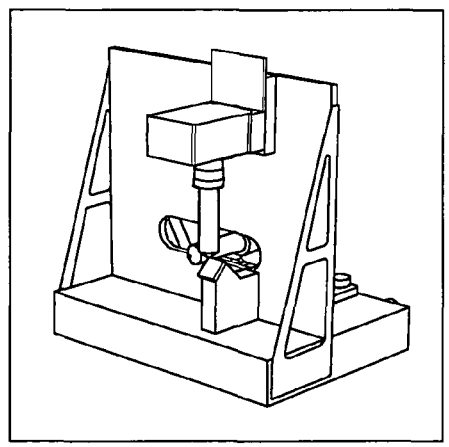
Figure 4B:
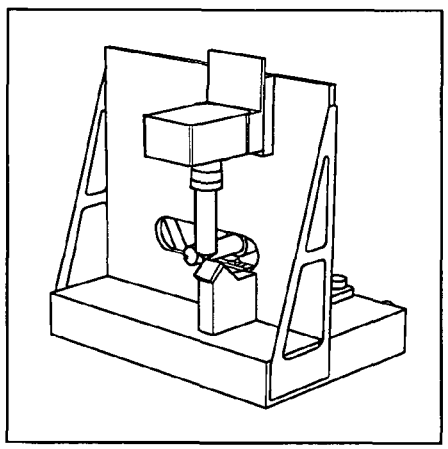
Figure 4B:
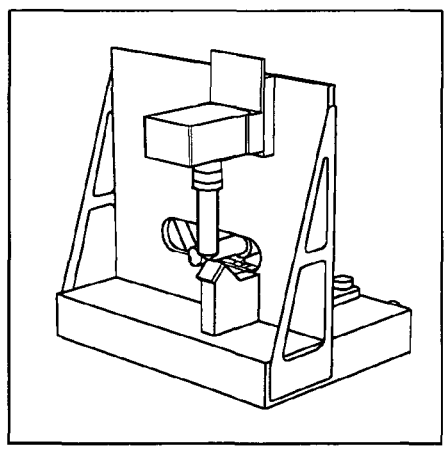
Figure 4C:
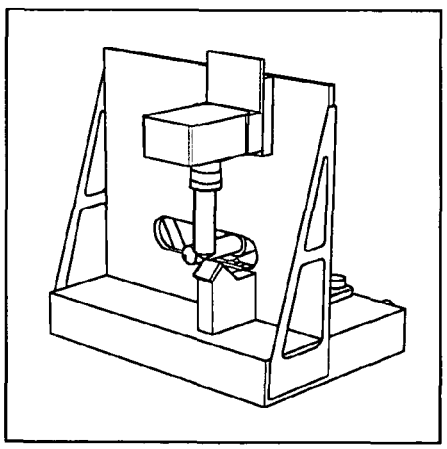
Figure 4C:
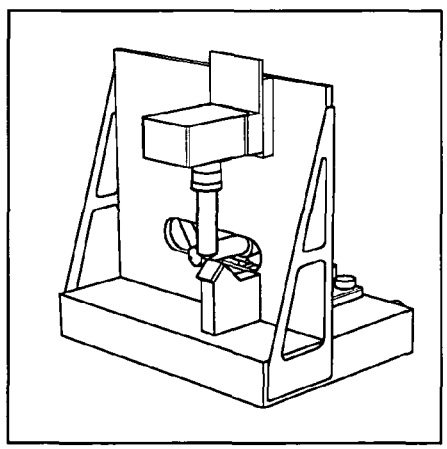
Figure 6:
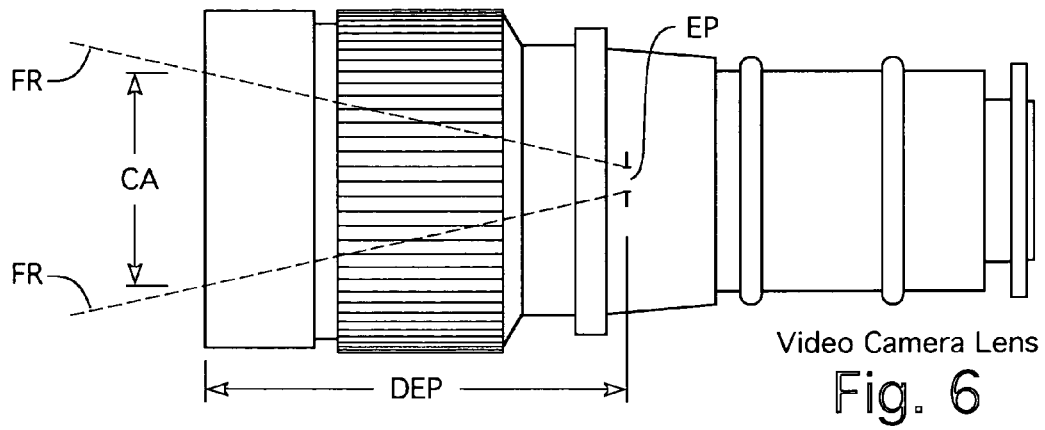
FIG. 6 is a zoom prior art lens of a type sold by Fujinon and Canon used on video cameras, for example on the Sony HDW-F900 video camera.
Figure 7:
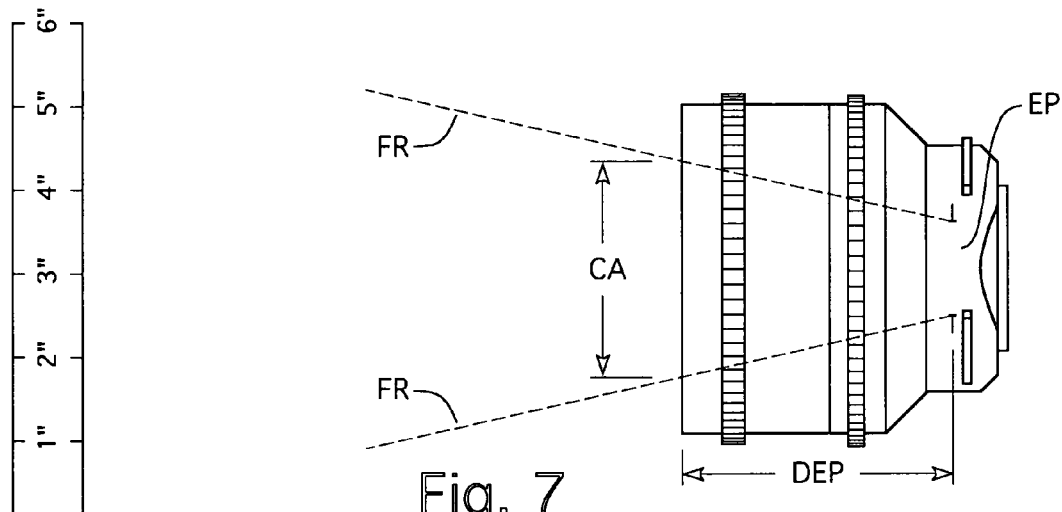
FIG. 7 is a primary (non-zoom) prior art lens used on a 65 mm-format movie camera.
Figure 8:
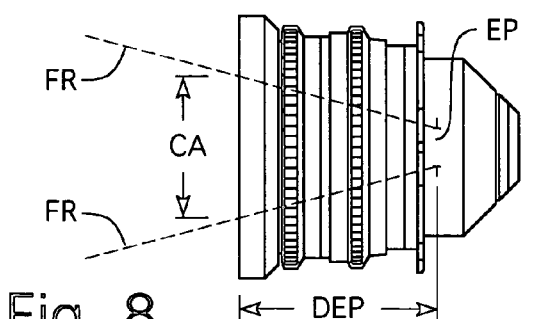
FIG. 8 is a prime prior art lens used on an Arriflex 35 mm-format movie camera.
Figure 9:
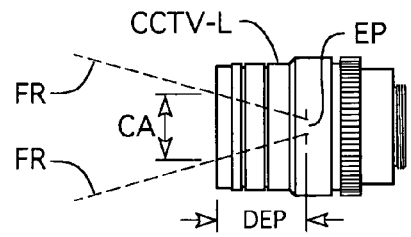
FIG. 9 is a compact C-mount prior art lens originally made inexpensively for CCTV cameras for video surveillance in stores; however, recently higher quality lenses in this format have been made for high-definition video cameras, for example for the Silicon Imaging SI-2K MINI camera.

| | |
|---|---|
| B | Barrel of lens, FIG. 12b |
| BC | Board Camera, FIG. 11 |
| BCPL | Board-Camera Pinhole Lens, FIG. 11 |
| BS | Beamsplitter, beam-splitting mirror, FIG. 2, 3a-c |
| CA | Clear Area (of lens or beamsplitter) needed to cover field of view, FIGS. 2, 6-8 and 13a and 13b |
| CAS | Convergence Adjustment Shaft, FIGS. 16a, 16c-22b |
| CD | Convergence Distance, FIGS. 2a-2c |
| CL | Clearance between physical edge of lens barrel and reflected sight line of that lens, i.e., the clearance necessary to keep a lens from seeing a reflection of itself in the beamsplitter (FIG. 2) or mirror (FIGS. 14b, 15b) |
| CCTV-L | Compact Lens, typically used on closed-circuit television cameras, FIGS. 9, 14a, 14b, 15a and 15b |
| CD | Convergence Distance, FIGS. 2a-2c |
| CRG | Carriage for movable camera, FIGS. 17, 18, 19b, 22b |
| CT | Conical tip, FIG. 12b |
| DC | Direct-View Camera (sees an image not reflected by beamsplitter or mirror), FIGS. 1, 3a, 3b, 3c, 14a, 14b, 15a, 15b, 16a, 16b, 16c, 19b and 22b |
| DEP | Depth of Entrance Pupil behind front of lens, FIGS. 6-9 |
| EQUIV-EP | Optically-equivalent position of entrance pupil, FIGS. 14a, 15a and 16b |
| EP | Entrance Pupil, FIGS. 1, 6-9, 13a and 13b, 14a, 14b, 15a, 15b, 16b |
| FP | Flat Plate, FIG. 1, 2, 14a, 14b, 15a, 15b |
| FPBR | Flat-plate Beamsplitter 3-D Camera Rig, FIG. 2 |
| FR | Field Rays, light rays that define the lens' field of view, FIGS. 3a, 4b, 3c, 6, 7, 8, 9, 10, 12, 13b, 14b, 15b |
| IAX | Interaxial Spacing, FIGS. 1, 2, 3a, 3c, 14a, 15a, 16b, 19b, 22b |
| LE | Lens element, FIG. 12b |
| OM | Opaque Material (typically cardboard), FIG. 10 |
| OMPL | Opaque-Material Pinhole Lens, FIG. 10 |
| M | fully-reflective Mirror, FIG. 14a, 14b, 15a, 15b, 16b, 16c |
| PEEP-L | Peephole Lens, FIGS. 13, 15a, 15b |
| Pinhole Lens 3-D Rig | Pinhole-lens 3-D camera rig, FIGS. 16a-c |
| PNHL | Pinhole Lens, FIGS. 12a, 12b, 16a, 16b, 16c, 19b, 22b |
| R | Radius of curvature, FIG. 19b |
| RAIL | Curved Rail, FIGS. 16a, 16c, 17, 18, 19a-22b |
| RC | Reflected Camera, FIGS. 2, 3a-c, 14a, 14b, 15a, 15b, 16a, 16b, 16c |
| ROL | Rollers (Linear-Rotary Bearings), FIGS. 17, 18, 19b, 22b |
| SSC | Side-by-Side 3-D camera rig, FIG. 1 |
| WG | Worm Gear, FIGS. 16c, 19a-22b |

The present invention is directed to a dual-camera 3-D rig that is much more compact and lighter than existing 3-D rigs for two reasons, either of which by itself represents a significant advance in the state of the art. First, it relies upon heretofore unused optics in that it uses pinhole lenses and a fully-reflective small mirror. Second, it relies upon a compact mechanism in the base plate which provides independent adjustment of the interaxial and convergence settings. In an especially preferred embodiment of the present invention described hereinafter, both of these aspects are combined with additional features still to be described.

The 3-D camera rig of the present invention uses "pinhole" lenses. FIGS. 10, 11, 12*a* and 12*b* all illustrate what may be called "pinhole lenses," but are very different in design.

FIG. 10 is the original pinhole "lens" made by punching a straight pin or needle through black cardboard to make a pinhole camera, and is included for reference and completeness. However, this type of "lens" does not have the quality necessary to make it useful for a professional 3-D camera rig.

FIG. 11 is a board-level camera from approximately 0.75 to 0.25 inch square, mounted to an electrical circuit board to be integrated into security surveillance cameras and cell phones. The lens is mounted behind a very small aperture which serves much like the lens in the cardboard pinhole camera; however the lens improves focus. These board-level cameras have lenses with small apertures that provide sharp focus from infinity to only inches from the lens, and therefore do not require focusing by the user.

FIG. 12 is the type of "pinhole lens" utilized in an especially preferred embodiment of the present invention. This type of lens is typically designed with a C-mount to be used on CCTV security cameras for video surveillance and can be used on C-mount high-definition cameras, for example on the Silicon Imaging SI-2K MINI camera. These pinhole lenses are typically 3-5 inches long and have front barrel diameters well under 1 inch. The main advantages of this type of lens for the 3-D camera rig of the present invention are (1) that the entrance pupil EP is designed to be at the front surface of the lens barrel, (2) the entrance pupil is extremely small, approximately 1 mm diameter or less, and (3) the lens barrels are designed with conical tips which can be conveniently positioned close to the 45° mirror of the 3-D camera rig of FIG. 16*a*-*c*.

FIG. 13 is a door peephole lens, not an image-forming lens as are the other lenses described here, but rather is an afocal wide-angle lens adapter. This peephole lens is used in conjunction with a conventional lens, for example the CCTV lens of FIG. 9. The advantage of using the peephole lens is that its entrance pupil is very small (less than approximately 1 mm diameter) and near the front tip which allows use of a small 45° mirror as in FIGS. 15*a* and 15*b*.

A preferred embodiment of the 3-D camera rig of the present invention uses "pinhole" lenses which have been designed with the entrance pupil which is physically small (typically 1 mm diameter) and at a position in front of the glass in the lens, at a hollow conical tip at the front of the lens. The pinhole lens is a special lens designed for security and surveillance work, and not known to be used in shooting motion pictures in the motion picture or TV industries. However, the small lens barrel, tiny entrance pupil, forward entrance-pupil location, and conical shape of the front of these pinhole lenses, make pinhole lenses ideal for designing a compact 3-D camera rig because, instead of requiring a large light-sharing 45° beamsplitter, a tiny fully-reflective 45° mirror can be used at the tip of only one camera, typically a down-looking camera. The tip of the lens of the alternate forward-looking camera can be positioned very close to mirror of the reflected camera so as to provide a small minimum interaxial spacing.

The 45° mirror also has an enormous advantage in that it is essentially fully reflective. Therefore there is not the light loss that 3-D filmmakers are accustomed to when using a beamsplitter rig where the light from the scene was shared by both cameras, each camera getting 50% of the light.

The use of a fully-reflective 45° mirror at the tip of the down-looking lens eliminates the traditional 45° beamsplitting mirror which reduces the light to both cameras by one T-stop. This light loss, when using beamsplitter rigs, required filmmakers to either open the lenses one T-stop, undesirably reducing depth of field, or to double the light on the scene. Doubling the light on a scene is no small problem. Twice the light required doubling the lights themselves, and also the generator trucks, the heat on the actors, and the cost of production. This one-T-stop light loss of beamsplitter-type 3-D rigs has been the biggest objection by producers, directors and cameramen to the use of beamsplitter 3-D rigs.

Although a preferred embodiment of the present invention utilizes two pinhole lenses in a substantially 90° relationship with the fully-reflective mirror being at 45°, there is nothing magic about the 90° orthogonal relationship between cameras. That angle could be 86°, 91° or anything that gets one lens out of the way of the other lens. 90° keeps the rig design simple. Correspondingly, the mirror does not necessarily have to be 45°, but it will be half the angle between the two camera lenses, i.e. 43° if the cameras are at 86° to each other.

When two pinhole lenses are used in a 3-D camera rig according to the present invention one camera is typically fixed or stationary (typically the down-looking camera) while the other camera (typically, the forward-looking camera) is laterally adjustable to increase or decrease the amount of stereoscopic depth. Because small-diameter pinhole lenses form a small entrance pupil out in front of the glass, the tip of the lens barrel typically have a conical shape. When two such lenses are used together, one facing forward, and the other orthogonal (typically, facing downward) so that the entrance pupils of both lenses can be physically close to each other, the close spacing is facilitated by the conical tips not interfering with each other. A conical geometry of the tip and the small entrance pupil also allow a fully reflective 45° mirror to be located at the tip of the vertical lens so that the reflected position of its entrance pupil is beside and close to the entrance pupil of the forward-looking camera, which also means that only a small area of the mirror is needed. Indeed, the reflective area needed for such a mirror has been calculated to be less than 1% of the equivalent reflective area on the beamsplitter of a conventional beamsplitter 3-D camera rig of FIGS. 2a-c or 3a-c.

To ensure proper positioning of the mirror, light-emitting diodes ("LEDs") can be located below the mirror, aimed upward into the down-looking camera. The mirror is adjustable laterally in its own plane until its edge just blocks the LED light to the lens. This assures that the mirror fully covers the field of view of the down-looking lens.

To ensure proper position of the forward-looking camera to determine the minimum interaxial spacing, additional LED's are located to shine horizontally on the occluding edge of the adjustable mirror. The forward-looking camera is then adjusted laterally (changing its interaxial spacing relative to the stationary down-looking camera) until it no longer sees the illuminated edge of the mirror. This minimum interaxial spacing will vary for different lenses due to the angular field of view.

FIGS. 14a and b are of a dual camera 3-D rig using a fully reflective first-surface mirror and cameras fitted with compact lenses CCTV-L. FIG. 14a is the front view showing the down-looking reflected camera RC seeing an image reflected upward into the camera lens by mirror M. The mirror is shown as small as possible to cover the field of view of the lens. Forward-looking camera DC is shown beside the mirror M, spaced as closely as possible to the mirror. However, because of the physical size of the lenses, and the depth DEP of the entrance pupils EP in the lenses, the minimum interaxial spacing IAX is too large (2.3 inches) for a general purpose 3-D camera rig. A 12-inch ruler is shown for reference.

FIGS. 15a-b are of a dual camera 3-D rig using a fully-reflective mirror and cameras fitted with compact lenses CCTV-L and peephole lenses PEEP-L. The small size of the entrance pupils EP in the peephole lenses, and up-front position of the entrance pupils EP allows a small mirror M to be used, which allows a narrow minimum interaxial spacing IAX.

FIGS. 16a-c are of a compact dual-camera 3-D rig, the subject of this invention, which makes use of pinhole lenses PNHL, of FIG. 12b, and mirror M. This rig does not use the light robbing beamsplitter BS shown in FIGS. 2 and 3. This rig uses pinhole lenses PNHL (FIG. 12b) with a small 45° mirror mounted very close to the tip of the pinhole lenses. This mirror can be very small due to the entrance pupil of the lens being positioned at the front of the lens, and aided by the conical shape of the front of the lens barrel. Advantages are (1) twice the amount of scene light reaching both cameras, compared to beamsplitter rigs, (2) the beveled tip of the lens, (3) the ability to have a small minimum interaxial spacing, and (4) large depth of field and sharply focused images due to the small entrance pupils. This camera rig provides the same interaxial and convergence adjustment range as the much larger beamsplitter rig (shown in FIGS. 2 or 3a-c, and 4a-c) and of the convergence distance (shown in FIGS. 5a-c), but provides independent adjustment between the interaxial and convergence settings.

Figure 17:
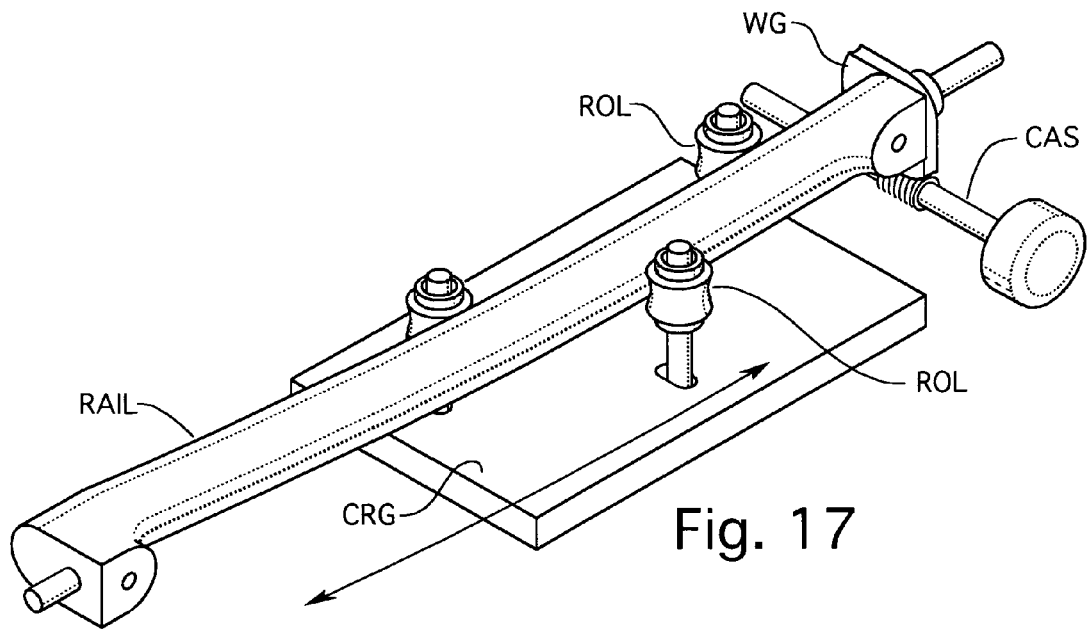
FIG. 17 is an isometric view of the underside of the convergence mechanism showing the curved rail RAIL rotated in a position with the plane of the rail's curve parallel to the plane of the carriage, CRG which can be adjusted along the length of the rail, to change interaxial spacing. The path of the carriage follows the sides of the rail. When the rail is turned with the curve parallel to the carriage, the carriage moves in a curve to follow the sides of the rail. See FIG. 19b.
Figure 18:
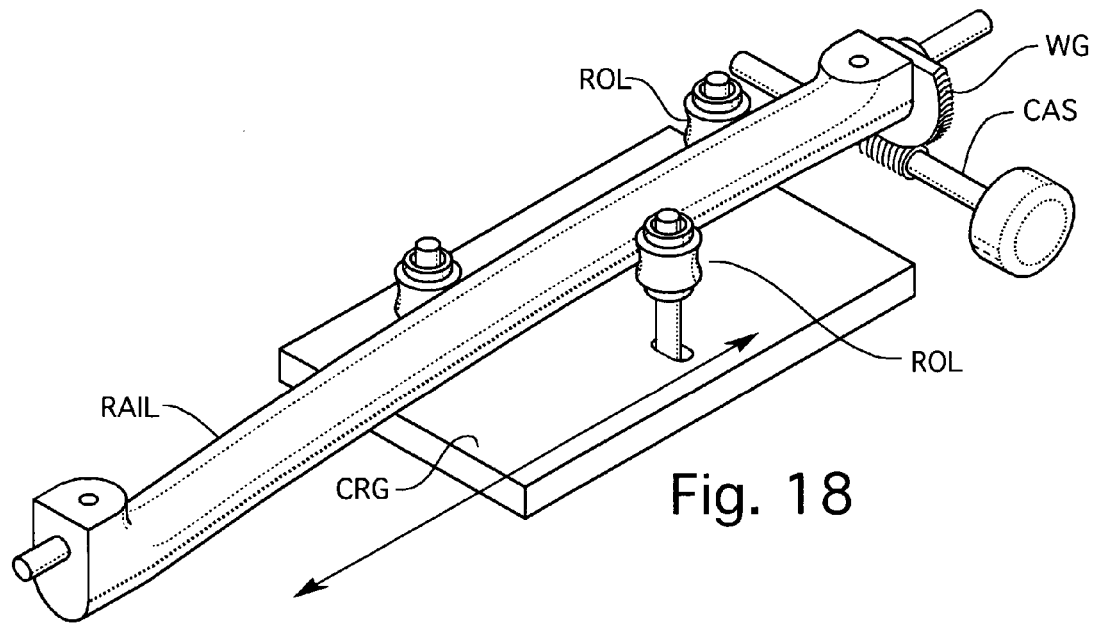
FIG. 18 shows the curved rail RAIL of FIG. 17 turned, using the convergence-adjustment shaft CAS and worm gear WG, to the vertical position, with the plane of the rail's curve perpendicular to the plane of the carriage, so that any lateral motion of the carriage CRG is purely translational, causing the movable camera DC to move laterally, maintaining parallel lens axes (no convergence, referred to in the movie industry as infinity convergence). See FIG. 22*b*.

FIG. 17 is an isometric view of the underside of a convergence mechanism showing the curved rail RAIL, in an especially preferred embodiment of the present invention, rotated in a position so that it causes the carriage and camera to follow the curve of the rail. See FIG. 19b. The curvature of the rail causes the camera, when the interaxial spacing is adjusted, to move as if pivoting around a point in the photographic scene, which is at the convergence distance of the two cameras. The distance of this virtual pivot, or instant center, is adjustable by rotating the rail. Three linear rotary bearings, which can both rotate and move linearly on ball bearings, are used on three shafts which are connected to the camera-carrying carriage CRG. The rail rotates on shafts, on a common axis at both ends. At one end of the rail is a worm gear WG which is fixed to the rail. The teeth at the perimeter of the worm gear engage with the worm on the convergence-adjustment shaft CAS. When the convergence-adjustment shaft is rotated the rail is turned through a 90° rotation to adjust the convergence distance (the distance of the virtual pivot point) from infinity (straight rail) to the minimum distance, typically 4 feet with the rail in the most curved position. See FIGS. 19a, 20a, 21a and 22a. Intermediate convergence distances are achieved by rotating the curved rail between the 0° and 90° positions. If the rail is a simple cylindrical pipe which has been bent into a circular curve, intermediate settings will be elliptical approximating a circular curve; however, the difference (the error) is negligible and of no practical consequence. It is possible to eliminate this residual error, so that the rail is curved circularly in all rotary positions, by machining a solid bar in increments to the desired curvature in small rotary increments.

FIGS. 19a and b show the curved rail RAIL rotated for maximum curvature, so that the carriage CRG moves around the virtual pivot at the minimum distance. FIG. 19b shows the movable camera at the minimum interaxial position (solid lines) and maximum interaxial position (dashed lines). Notice that the camera follows the curve of the rail and that the lens axes, if extended in the photographic scene, would converge. Any object photographed at that convergence distance would appear at the surface of the theater screen. See FIGS. 5a-c.

FIGS. 20a and b show the worm gear WG and rail RAIL having been rotated slightly so that the rail seems to be less curved to the rollers ROL which press on only the sides of the rail. The rollers "feel" only the sides of the rail and are not influenced by (are independent of) any change of position of the crown of the rail in the vertical direction.

FIGS. 21a and b show the rail having been rotated even more so that the rollers on the carriage "feel" even less curvature when the interaxial spacing between cameras is adjusted.

FIGS. 22a and b show the rail turned a full 90°, relative to the most curved orientation, so that the rail guides the carriage in a straight line, which causes the movable camera to move in a purely translational motion, with no curvature.

A 3-D rig according to the present invention has a great many advantages over traditional beamsplitter rigs. It has only 10% of the weight and 5% of the volume of traditional beamsplitter rigs, it has no T-stop light loss as with beamsplitter rigs, it has narrower minimum interaxial spacing than any side-by-side camera rig, and it is the lightest dual-camera rig with full range of interaxial and convergence adjustments, its base footprint being the size of a small notebook computer.

While the invention has been described herein with reference to certain preferred embodiments, those embodiments have been presented by way of example only, and not to limit the scope of the invention. Additional embodiments thereof will be obvious to those skilled in the art having the benefit of this detailed description. Further, modifications are also possible in alternative embodiments without departing from the inventive concept.

Accordingly, it will be apparent to those skilled in the art that still further changes and modifications in the actual concepts described herein can readily be made without departing from the spirit and scope of the disclosed inventions as defined by the following claims.

What is claimed is:

1. An apparatus for stereoscopic photography, comprising:
 a support;
 a first camera having a first lens, the first camera being mounted to the support;
 a curved structural member rotatably affixed to the support, the curved structural member being rotatable between a first position and a second position that causes the curved structural member to rotate relative to a lengthwise axis of the curved structural member; and
 a second camera having a second lens, the second camera being slidably mounted to the curved structural member so that it is free to move along the curved structural member so as to vary an interaxial spacing between the first and second cameras so as to increase or decrease an amount of stereoscopic depth of a stereoscopic photograph captured by said first and second cameras;
 wherein a convergence distance between an intersection of the lens axes of the first and second cameras is varied by adjustment of the curved structural member between the first and second positions so as to control an off-screen position of a subject captured in the stereoscopic photograph without changing a horizontal axis distance between the first camera and the second camera measured along the lengthwise axis of the curved structural member; and
 wherein the convergence distance and the interaxial spacing can be varied independently of each other such that changing the convergence distance by adjustment of the curved structural member between the first and second positions does not vary the interaxial spacing and varying the interaxial spacing by moving the second camera along the curved structural member does not vary the convergence distance.

2. The apparatus of claim 1, wherein at least one of the first and second lenses is a pinhole lens.

3. The apparatus of claim 2, wherein the pinhole lens is comprised of:
 a barrel;
 a plurality of lens elements located in the barrel; and
 an entrance pupil at the front of the barrel.

4. The apparatus of claim 3, wherein the pinhole lens is further comprised of a protruding conical tip located at the front of the barrel.

5. The apparatus of claim 4, wherein the entrance pupil is located in the protruding conical tip.

6. The apparatus of claim 2, further comprising:
 a fully-reflective mirror positioned along an axis of the first lens, a position of the mirror being such that a reflected image of a first camera entrance pupil is at the same vertical and longitudinal position as a second camera entrance pupil.

7. The apparatus of claim 6, wherein the position of the mirror is such that the reflected image of the first camera entrance pupil is at substantially the same vertical and longitudinal position as the second camera entrance pupil.

8. An apparatus for stereoscopic photography, comprising:
 a support;
 a first camera mount for mounting a first camera with a first lens to the support;
 a curved structural guide member rotatable between a first position and a second position that causes the structural guide member to change a profile of the curved structural guide member imparted to a second movable camera in a generally lateral motion relative to a lengthwise axis of said curved structural guide member; and
 a second camera mount for mounting a second camera with a second lens to the structural member along the curve so that the second camera is movable so as to vary an interaxial spacing between the first and second cameras in a generally lateral direction along the lengthwise axis of the curved structural member so as to increase or decrease an amount of stereoscopic depth of a stereoscopic photograph captured by said first and second cameras;
 wherein a convergence distance between the first and second cameras is varied by rotational movement of the curved structural member about the lengthwise axis of the curved structural guide member between the first and second positions to present a different curvature profile to the sliding member so as to control an off-screen position of a subject captured in the stereoscopic photograph without changing a horizontal axis distance between the first camera and the second camera measured along the lengthwise axis of the curved structural member; and wherein the convergence distance and the interaxial spacing can be varied independently of each other such that changing the convergence distance by adjustment of the curved structural member between the first and second positions does not vary the interaxial spacing and varying the interaxial spacing by moving the second camera along the curved structural member does not vary the convergence distance.

9. The apparatus of claim 8, wherein an interaxial spacing between the first camera mounted in the first camera mount and the second camera mounted in the second camera mount can be varied independent of any change to the convergence distance between the first and second cameras by sliding the second camera on the structural member along the curve and the convergence distance between the first and second cameras can be varied independent of any change to the interaxial spacing between the first and second cameras by rotational adjustment of the curved structural member between the first and second positions.

10. The apparatus of claim 8, further comprising:
a fully-reflective mirror positioned along an axis of the first lens, a position of the mirror being such that a reflected position of a first entrance pupil of the first camera lens is at the same height and longitudinal position as the entrance pupil of the second camera lens.

* * * * *